Patented Aug. 10, 1943

2,326,195

UNITED STATES PATENT OFFICE 2,326,195

PROTEIN RECOVERY

Lawrence W. Bass and Harold S. Olcott, Pittsburgh, Pa., assignors to Cotton Research Foundation, a corporation of Tennessee No Drawing. Application August 2, 1940, Serial No. 350,128

1 Claim. (Cl. 260—112)

This invention relates to the recovery of protein by precipitation from solution, and consists of a method that facilitates recovery, and reaches sources not otherwise responsive to such treatment.

In Letters Patent of the United States No. 2,194,835, granted on the application of Ralph F. Nickerson, a procedure is described of the recovery of protein from cottonseed. The cottonseed is dehulled and fragmented to the condition of meal; from the meal the oil is first extracted, and with it the gossypol; then, by leaching under specified conditions, the water-soluble protein is removed. The washed meal is dispersed in water (in the presence of an antioxidant) and the dispersal is alkalinated to a pH value of 10. Under such conditions the desired protein goes into solution. The solution is separated from the solid residue; and from it by acidification the protein is precipitated. Nickerson says that, to effect this precipitation, he has employed hydrochloric, acetic, and sulfuric acids; and that he has found sulfuric to be best. He alludes to difficulties attending acidification. He says that the manner in which the acid is added to the alkaline extract has considerable bearing upon the resulting precipitation; he notes the bad effect of over-acidification; and says that the addition should proceed slowly, while the extract is stirred vigorously; otherwise, excessive local acid concentration may occur with accompanying denaturation of a portion of the protein.

The present invention lies in the discovery that if, instead of acidification by the stirring in of a liquid acid such as sulfuric, the extract be acidified by bubbling with carbon dioxide gas into the solution not only will the desired precipitation be effected, but the procedure will be relieved of difficulties of the nature indicated. The invention involves the further discovery that precipitation of protein from solution by saturation with carbon dioxide may, with proper control of circumstances, be extended to a wider range of utility.

In practising the invention upon cottonseed meal, the meal is first freed of its oil and gossypol contents, and its water-soluble protein content is leached away, as described in the Nickerson patent. It is then extracted with an alkali solution, and the alkaline extract, carrying in solution the desired water-insoluble protein, is centrifuged free of the solids. Carbon dioxide gas is then introduced into and caused to saturate the separated solution. This introduction of carbon dioxide gas is conveniently effected by bubbling the gas through in conventional manner. With the introduction of the gas the excess alkali is neutralized, and the pH value of the solution falls rapidly to 5.9–6.2. This is in the iso-electric region of the protein, and in the region of optimum precipitation; and precipitation ensues. The continued passage of carbon dioxide gas into the solution does not reduce further the pH value. Over-acidification does not occur; excessive local acid concentration does not occur; and the recovery of the protein is freed of difficulty.

A further important advantage of the method resides in the production of proteins containing no adsorbed acid. When proteins are precipitated from their solutions with strong acids such as sulphuric, the precipitate adsorbs large amounts of the acid. Such precipitates may be washed repeatedly with water without removing such acid. After drying, resuspension of the ground product in water yields a solution which may be even more acid (as measured by pH) than the original precipitate. In the method of our invention, adsorption of acid may occur during the precipitation reaction; however, the acid (carbonic) is easily decomposed, yielding water and carbon dioxide. Hence, when the protein solids are dried, the carbon dioxide is dissipated in the air. Such proteins would in all likelihood be more stable on long standing than those prepared by inorganic acid precipitation, inasmuch as, in the latter case, the residual acid acts on standing in such manner as to denature the protein, render it less soluble in various reagents, and hence less useful in the arts.

Into an alkaline extract (150 lbs.) of cottonseed meal, previously relieved of oil, gossypol, and water-soluble protein, carrying approximately three pounds of protein not soluble in water, and having a pH value of 10.4, carbon dioxide gas was introduced, using a bubbler of commercial type, at the rate of approximately 250° c. c. per minute, and with the following effect upon pH value—

| Time in min. | pH |
|---|---|
| 0 | 10.4 |
| 2 | 7.1 |
| 4 | 6.4 |
| 8 | 6.2 |
| 16 | 6.15 |
| 20 | 6.15 |

It will be remarked on considering this tabulation that prolonged treatment with carbon dioxide did not have effect to reduce the pH value beyond 6.15, when once that value has been reached. And, as has been said, at that pH value precipitation occurs.

Similar results may be reached with the meals of certain other seeds—of hempseed, for example. The alkaline extract of hempseed meal may by the introduction of carbon dioxide be brought to a pH value of substantially 6; and at that pH value the globulin fraction of the hempseed protein (edestin) will be precipitated completely. But there remain other seeds whose alkaline extracts are not so immediately responsive to treatment with carbon dioxide.

Our further invention lies in the discovery that, by varying certain conditions under which the carbon dioxide is introduced, the point to which the pH value of a solution may be brought and at which it may be maintained can be varied; and we have perceived that, by such variation, the pH value thus attainable may be made substantially coincident with the iso-electric point of the otherwise unresponsive solution; whereupon precipitation follows. We have discovered that such variation may in some measure (though slightly, within permissible range) be brought about by change in temperature, and more effectively by change of pressure. The lower the temperature, the lower the figure to which the pH value may be reduced; the greater the pressure, the lower the figure.

In the case of soy-bean protein, saturation with carbon dioxide at atmospheric pressure does not result in precipitation of the protein from an alkaline extract of the meal, inasmuch as the principal globulin of the soy-bean has an isoelectric region at pH 4.0 to 4.5. We have, however, discovered that precipitation can in this case be effected by saturation with carbon dioxide when the operation is conducted under pressure. At 250 pounds pressure, conditions are optimum; precipitation is most complete; and the separated protein is most easily filtered. The entire procedure must be carried through without release of pressure, that the pH may be kept in the desired region. If the pressure were released prior to the filtration operation, carbon dioxide would escape from the solution, the pH would rise to approximately 6.0, and re-solution would occur.

The method of the invention is applicable under atmospheric temperature and pressure to solutions whose protein precipitates at a pH value of approximately 6; and is further applicable under higher pressures to those whose protein precipitates at a lower pH value than 6.

We claim as our invention:

The method herein described of recovering from oil-free cottonseed meal, after the separation from it of its water-soluble protein, its remaining protein content, which consists in extracting by means of an alkaline solvent such remaining protein content, and bubbling the solution through with carbon dioxide in gaseous state, whereby, over-acidification being avoided, the pH value of the solution is brought within and maintained within the iso-electric region of the protein, with precipitation of the protein.

LAWRENCE W. BASS.
HAROLD S. OLCOTT.